US006541411B2

(12) United States Patent
Hoffmann et al.

(10) Patent No.: US 6,541,411 B2
(45) Date of Patent: Apr. 1, 2003

(54) TITANIUM/ZIRCONIUM CATALYSTS AND THEIR USE TO PREPARE ESTERS OR POLYESTERS

(75) Inventors: Andreas Hoffmann, Köln (DE); Hartmut Nefzger, Pulheim (DE); Erika Bauer, Jüchen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/995,332

(22) Filed: Nov. 27, 2001

(65) Prior Publication Data

US 2002/0107143 A1 Aug. 8, 2002

(30) Foreign Application Priority Data

Dec. 1, 2000 (DE) .......................................... 100 59 612

(51) Int. Cl.$^7$ ................................................ B01J 31/38
(52) U.S. Cl. ..................... 502/108; 502/126; 502/127; 502/172; 502/349; 502/350; 521/123; 521/124; 521/170; 521/172; 521/173; 528/279
(58) Field of Search ................................ 502/108, 126, 502/127, 172, 349, 350; 521/123, 124, 170, 172, 173; 528/279

(56) References Cited

U.S. PATENT DOCUMENTS

| | | | |
|---|---|---|---|
| 2,822,348 A | | 2/1958 | Haslam |
| 3,047,515 A | | 7/1962 | Piirma |
| 5,660,926 A | * | 8/1997 | Skowronski et al. ..... 428/314.4 |
| 5,866,710 A | | 2/1999 | Ridland et al. ................ 560/98 |
| 6,080,834 A | | 6/2000 | Putzig et al. ................ 528/279 |
| 6,372,929 B1 | * | 4/2002 | Ridland et al. ............. 502/162 |

* cited by examiner

*Primary Examiner*—John M. Cooney, Jr.
(74) *Attorney, Agent, or Firm*—Joseph C. Gil; N. Denise Brown

(57) ABSTRACT

The invention relates to novel titanium/zirconium catalysts, and to a process for the preparation of these titanium/zirconium catalysts. The process comprises reacting orthoesters or condensed orthoesters of titanium and/or zirconium, with one or more polyalcohols. Suitable polyalcohols comprise those compounds having at least two hydroxyl groups and a number average molecular weight of at least 180 g/mol. The invention also relates to a process for preparing (poly)esters from these novel catalysts, which exhibit little discoloration and are suitable to be used as a reaction component in the preparation of polyurethane (PUR) foams.

12 Claims, No Drawings

TITANIUM/ZIRCONIUM CATALYSTS AND THEIR USE TO PREPARE ESTERS OR POLYESTERS

BACKGROUND OF THE INVENTION

The invention provides new types of titanium/zirconium catalysts, a process for preparing these catalyst, and their use in esterification reactions, transesterification reactions and polycondensation reactions to prepare esters or polyesters.

Polyesters are important industrial polymers which have been used for some time now, for example, to produce fibers or as polyol components in polyurethane systems (see G. Oertel in Polyurethane Handbook, Hanser Publishers (1994), p. 65–72). Polyesters are prepared either by direct esterification of low molecular weight polycarboxylic acids (e.g. adipic acid) with low molecular weight polyalcohols (e.g. diethylene glycol) or by transesterification starting from alkyl esters of polycarboxylic acids and polyalcohols. A catalyst is generally used in either of the reactions mentioned above in order to shorten the reactor occupation times and to build up high molecular weights (see R. E. Wilfong in Journal of Polymer Science, vol. 54 (1961), p. 385–410 and A. Fradet, E. Maréchal in Advances in Polymer Science 43, Springer Verlag (1982), p. 51–142). Many commercial processes use, for example, manganese, zinc, antimony or tin salts as catalysts for esterification, transesterification or polycondensation reactions. However, the problem with some of the metal compounds mentioned above is the tendency to form insoluble complexes which can cause problems during further processing of the esters or polyesters. In addition, the physiological unacceptability and potentially harmful effects in the environment of the classes of compounds mentioned above are increasingly acting against their use as catalysts.

Organic titanium compounds, in particular titanium orthoesters such as, for example titanium tetraisopropylate and titanium tetra-n-butylate, are also effective and frequently used esterification, transesterification and polycondensation catalysts. See, for example, U.S. Pat. No. 2,822,348. General use of these titanium catalysts, however, is restricted due to a number of disadvantages. Thus, organic titanium compounds can be insoluble in the reaction mixture (e.g. poly(titanium alkylate)), which leads to uneven distribution of the catalyst and has an effect on its activity. Furthermore, certain titanium catalysts are hydrolysis-sensitive which impairs the storage-stability of the catalyst systems. In addition, polymeric titanium compounds may be produced during the course of reaction, which ultimately results in a cloudy reaction product which can be purified only by means of a costly filtration procedure. In addition, titanium compounds normally react with traces of impurities such as, for example, aldehydes, which are also produced during the esterification, transesterification or polycondensation reaction and in this way produce unwanted yellow coloration in the reaction product. It has been shown that such unwanted discoloration can be counteracted by the use of multi-component catalyst systems. Thus, for example, U.S. Pat. No. 6,080,834 describes a catalyst system consisting of a titanium compound, a complexing reagent (e.g. a hydroxycarboxylic acid), a phosphorus compound and, optionally, other additives in a solvent. The use of catalyst systems consisting of titanium orthoesters, alcohols (e.g. ethylene glycol), 2-hydroxycarboxylic acids and bases (e.g. sodium hydroxide) is described in, for example, U.S. Pat. No. 5,866,710. The preparation of such complicated catalyst systems is obviously costly and therefore has a large economic impact when used in esterification, transesterification and polycondensation reactions. In addition, there is the risk that further processing of the esters or polyesters in various applications (e.g. polyurethane systems) may be impaired by the presence of the additives mentioned above in the catalyst systems.

For the reasons discussed above, there is a need for new types of catalysts which are characterized by the simplest possible composition, high activity in esterification, transesterification and/or polycondensation reactions, adequate solubility in the starting components and in the end product, and good resistance to hydrolysis, and which are physiologically acceptable. It is also desirable that catalysts according to the invention lead to a reaction product with improved optical properties (e.g. less unwanted color in the polyester).

Surprisingly, it has now been found that when using suitable starting materials new types of catalysts can be prepared which, in comparison to the catalysts described above, are characterized by a simpler, and thus, more economically viable composition and which exhibit good resistance to hydrolysis. In addition, catalysts according to the invention provide a reaction product with improved optical properties, i.e. less unwanted color in the esters or polyesters. Other advantages of catalysts according to the invention (e.g. high activity, good solubility in the starting components and in the end product, physiological acceptability) are also obtained.

SUMMARY OF THE INVENTION

The present invention thus provides titanium and/or zirconium catalysts comprising the reaction product of:

a) one or more orthoesters or one or more condensed orthoesters of titanium and/or zirconium; with b) one or more polyalcohols which contain at least two hydroxyl groups and have a number average molecular weight of at least 180 g/mol;

wherein the molar ratio of polyalcohol b) to orthoester or condensed orthoester of titanium and/or zirconium a) is at least 2:1.

Orthoesters or condensed orthoesters of titanium or zirconium a) are used to prepare catalysts according to the invention. In a preferred embodiment, the orthoesters correspond to the general formula:

$$M(OR)_4,$$

wherein:
  M: represents titanium or zirconium, and
  each R: may be the same or different, and individually represents a linear alkyl group, a branched alkyl group or a cyclic alkyl group.

Suitable alkyl groups R in the general formula above preferably contain from 1 to 6 carbon atoms.

Particularly preferred orthoesters are titanium tetraisopropoxylate and titanium tetra-n-butoxylate.

Condensed orthoesters for the preparation of the catalysts of the invention are typically obtained by careful, partial hydrolysis of the titanium/zirconium orthoester and, inter alia but not exclusively, are represented by the general formula:

$$R^1O[M(OR^1)_2O]_nR^1,$$

wherein:
  M: represents titanium or zirconium; and each R$^1$: may be the same or different, and individually represents a linear alkyl group, a branched alkyl group or a cyclic alkyl group;

n: represents a number less than 20, and preferably a number less than 10.

In the formula above, the group R$^1$ preferably contains 1 to 6 carbon atoms.

Particularly preferred condensed orthoesters are poly (titanium isopropoxylate) and poly(titanium butoxylate).

The process for the preparation of the titanium and/or zirconium catalysts of the present invention comprises reacting a) one or more orthoesters or one or more condensed orthoesters, with b) one or more polyalcohols. Suitable polyalcohols for the present invention include those polyalcohols which contain at least two hydroxyl groups and have a number average molecular weight of at least 180 g/mol, in particularly preferred are those polyalcohols with two to six hydroxyl groups and a molecular weight of 180 g/mol to 4500 g/mol.

In a preferred embodiment, polyalcohols b) are polyetherpolyols. Polyetherpolyols used according to the invention may be prepared, for example, by polyaddition of alkylene oxides to polyfunctional starter compounds in the presence of caesium, rubidium, strontium or barium hydroxide or alternative basic catalysts. Polyetherpolyols used according to the invention are preferably prepared using a highly active double metal cyanide catalyst from a starter compound with on average 2 to 8, preferably 2 to 6, active hydrogen atoms and one or more alkylene oxides, as is described, for example, in U.S. Pat. No. 5,545,601 (believed to correspond to EP-A 761,708), the disclosure of which is herein incorporated by reference.

Preferred starter compounds for the polyetherpolyols include, for example, compounds with at least two hydroxyl groups per molecule such as 1,2-ethanediol, 1,2-propanediol, 1,3-propanediol, diethylene glycol, dipropylene glycol, triethylene glycol, tripropylene glycol, 1,2-butanediol, 1,3-butanediol, 1,4-butanediol 1,2-hexanediol, 1,3-hexanediol, 1,4-hexanediol, 1,5-hexanediol, 1,6-hexanediol, glycerine, trimethylolpropane, pentaerythritol, sorbitol and saccharose. Further preferred starter compounds include ammonia or compounds which contain at least one primary or secondary amine group such as, for example, aliphatic amines such as 1,2-diaminoethane, oligomers of 1,2-diaminoethane (for example diethylenetriamine, triethylenetetramine or pentaethylenehexamine), 1,3-diaminopropane, 1,3-diaminobutane, 1,4-diaminobutane, 1,2-diaminohexane, 1,3-diaminohexane, 1,4-diaminohexane, 1,5-diaminohexane, 1,6-diaminohexane, aromatic amines such as 1,2-diaminohexane, 1,3-diaminobenzene, 1,4-diaminobenzene, 2,3-diaminotoluene, 2,4-diaminotoluene, 3,4-diaminotoluene, 2,5-diaminotoluene, 2,6-diaminotoluene, 2,2'-diaminodiphenylmethane, 2,4'-diaminodiphenylmethane, 4,4'-diamino-diphenylmethane or other aromatic amines which are obtained by acid-catalyzed condensation of aniline with formaldehyde or compounds which contain a hydroxyl group in addition to a primary, secondary or tertiary amine group such as, for example, ethanolamine, diethanolamine or triethanolamine. The starter compounds may be used individually or as a mixture.

Starter compounds which are particularly preferred for reaction with a highly active double metal cyanide catalyst can be obtained, for example, by conventional alkali catalysis from the previously mentioned hydroxy-functional low molecular weight starter compounds and alkylene oxides such as oxirane, methyloxirane and/or ethyloxirane.

Preferred alkylene oxides for preparing polyetherpolyols for use as polyalcohols in accordance with the invention are oxirane, methyloxirane and ethyloxirane. These may be used either individually or as a mixture. When used in a mixture, it is possible to incorporate the alkylene oxides in a random or blockwise manner or to use the two processes one after the other.

One or more polyesterpolyols consisting of aromatic and/or aliphatic polycarboxylic acids and polyols which contain at least two hydroxyl groups may also be used, either exclusively or in a mixture with the polyetherpolyols described above, as polyalcohol component b).

Examples of suitable dicarboxylic acids are phthalic acid, isophthalic acid, terephthalic acid, fumaric acid, maleic acid, azelaic acid, glutaric acid, adipic acid, suberic acid, sebacic acid, malonic acid and succinic acid. The pure dicarboxylic acids or any mixtures thereof at all may be used. Instead of the free dicarboxylic acids, the corresponding dicarboxylic acid derivatives such as, e.g. monocarboxylates or dicarboxylates of alcohols with one to four carbon atoms may also be used. Dicarboxylic anhydrides such as phthalic anhydride or maleic anhydride may be used as carboxylic acid components.

The following are preferably used as polyol components for esterification: ethylene glycol, diethylene glycol, tetraethylene glycol, 1,2-propanediol, 1,3-propanediol, 1,4-butanediol, 1,5-pentanediol, 1,6-hexanediol, 1,10-decanediol, glycerine, trimethylolpropane, pentaerythritol or mixtures thereof.

Polyesterpolyols prepared from lactones, e.g. ε-caprolactone, or hydroxycarboxylic acids, e.g. ω-hydroxycarboxylic acids, may also be used. The polyalcohol may also contain polyetheresterpolyols such as can be obtained, e.g. by reacting phthalic anhydride with diethylene glycol followed by reaction with oxirane.

The polyalcohol component b) may also contain, in addition to the polyol (e.g. polyether, polyester) having an average OH-functionality of at least 2.0, up to an amount of 80 wt. % of one or more monofunctional alcohols.

The catalysts according to the invention are prepared by reacting the orthoester or condensed orthoester of titanium or zirconium a), with one or more polyalcohols b), wherein the molar ratio of polyalcohol to titanium and/or zirconium compound, as mentioned, is at least 2:1. It is preferred to use 3 to 5 moles of polyalcohol per mole of titanium and/or zirconium compound. The catalyst according to the invention is prepared by mixing components a) and b) and removing any secondary products which have formed (such as 1-butanol, when the orthoester is, for example, titanium tetra-n-butylate). In a preferred embodiment, the polyalcohol is initially introduced, the orthoester or condensed orthoester is added, and then the secondary products which form are distilled off at temperatures of from 80° C. to 250° C., preferably from 100° C. to 200° C., optionally under reduced pressure. The catalyst according to the invention can be dissolved in all common solvents such as alcohols or glycols.

Preferred solvents include compounds such as, for example, ethylene glycol, diethylene glycol, dipropylene glycol, butanediol and/or hexanediol.

The present invention also provides a process for preparing titanium and/or zirconium catalysts according to the invention comprising reacting a) one or more orthoesters or one or more condensed orthoesters of titanium and/or zirconium; with b) one or more polyalcohols which contain at least two hydroxyl groups and have a number average molecular weight of at least 180 g/mol;

wherein the molar ratio of polyalcohol b) to orthoester or condensed orthoester of titanium and/or zirconium a) is at least 2:1.

Furthermore, the invention also provides a process for the preparation of (poly)esters (i.e. esters and/or polyesters) by appropriate esterification, transesterification or polycondensation reactions in the presence of the novel titanium and/or zirconium catalysts of the present invention.

Esters or polyesters can be prepared, as mentioned above, by direct esterification of low molecular weight polycarboxylic acids or carboxylic anhydrides with low molecular weight polyalcohols in the presence of the novel catalysts of the present invention, or by a transesterification reaction starting from alkyl polycarboxylates and polyalcohols in the presence of the novel catalysts of the present invention. Direct esterification and transesterification may also be performed starting from hydroxycarboxylic acids. A preferred process for preparing esters or polyesters in the presence of the catalysts according to the invention is performed by means of a polycondensation reaction.

Examples of low molecular weight polycarboxylic acids for preparing esters and/or polyesters include compounds such as phthalic acid, isophthalic acid, terephthalic acid, fumaric acid, maleic acid, azelaic acid, glutaric acid, adipic acid, suberic acid, sebacic acid, malonic acid and succinic acid. The pure dicarboxylic acids or any mixtures thereof may be used. Dicarboxylic anhydrides such as, for example, phthalic anhydride or maleic anhydride may also be used. Instead of the free polycarboxylic acids or carboxylic anhydrides, appropriate dicarboxylic acid derivatives such as, for example, monocarboxylates or dicarboxylates of alcohols with one to four carbon atoms may also be used. Lower homologues such as, for example, methyl esters are normally used because the alcohol being produced during reaction is then removed by distillation.

The following are preferably used as polyalcohol components for preparing esters or polyesters: ethylene glycol, diethylene glycol, tetraethylene glycol, 1,2-propanediol, 1,3-propanediol, 1,4-butanediol, 1,5-pentanediol, 1,6-hexanediol, 1,10-decanediol, glycerine, trimethylolpropane pentaerythritol or mixtures thereof.

Preparation according to the invention of esters or polyesters by esterification, transesterification or polycondensation in the presence of the catalysts according to the invention may be performed over a wide range of reaction conditions. Reaction is preferably performed in a temperature interval from 100° C. to 350° C., particularly preferably 150° C. to 230° C., wherein the pressure is varied between 0.001 bar and atmospheric pressure, depending on progress of the reaction. The amount of catalyst added during the preparation process depends on the titanium or zirconium content (Ti/Zr) of the catalyst. Normally, the metal concentration is in the range 0.1 ppm to 500 ppm, preferably 1 ppm to 12 ppm, with respect to the entire mass of the reaction product.

Preparation of a polyesterpolyol using adipic acid and a mixture of diethylene glycol and trimethylolpropane is preferred. In the case of a typically batchwise procedure, the starting materials are heated to a temperature of up to 200° C. in the reactor and the water being produced is distilled off under atmospheric pressure. After adding the catalyst according to the invention (1 to 12 ppm of metal), the pressure is reduced stepwise to 15 mbar. The water of reaction is distilled off at 200° C. until the acid value is ≦1.0 mg KOH/g. Obviously, the polyester may be worked up in a short-path evaporator (200° C./0.05 mbar) to remove cyclic ester fractions.

Polyesters according to the invention may be used to prepare polyurethane foams, in particular flexible foams. In addition, polyesters according to the invention may obviously also be used to prepare other polyurethane (PUR) systems (e.g. cast elastomers, fibers).

The process according to the invention represents a new, effective method of preparation of esters or polyesters which are characterized in particular by excellent color quality.

The contents of the present invention are intended to be explained with selected examples.

EXAMPLES

The following components and abbreviations are used in the examples.

TABLE 1

Abbreviations for polyetherpolyols used.

| Polyether | OH value [mg KOH/g] | Starter functionality | Primary OH groups |
|---|---|---|---|
| PET1 | 515 | 2 | 0% |
| PET2 | 374 | 2 | 100% |
| PET3 | 550 | 3 | 0% |

Preparation of Catalysts According to the Invention

Example 1

Polyether PET1 (0.48 kg; 2.20 mol) was placed in a reaction vessel with distillation bridges and dewatered for one hour (120° C./15 mbar). Then the vessel was cooled to 100° C., aerated with nitrogen and 0.23 times the molar amount (with respect to polyether) of titanium tetra-n-butylate (0.17 kg, 0.50 mol) were added. The temperature was slowly increased from 140° C. to 200° C. during the course of distilling 1-butanol out of the reaction mixture. When distillate no longer passes over, the temperature was lowered to 160° C and the pressure was reduced stepwise to 0.5 mbar, with the aid of a water pump or an oil pump, in order to remove residual 1-butanol from the reaction mixture. To complete the reaction, the temperature may be increased again to 200° C. A pale yellow reaction product with a Ti content of 5.32% (with respect to the total weight of catalyst) and a viscosity of 700 mPa·s (25° C.) was obtained.

Example 2

Using the same method as described in Example 1 above, polyether PET1 was reacted with 0.33 times the molar amount of titanium tetrabutylate (with respect to polyether). A pale yellow reaction product with a Ti content of 6.85% (with respect to the total weight of catalyst) and a viscosity of 18100 mPa·s (25° C.) was obtained.

Example 3

Using the same method as described in Example 1, polyether PET2 and 0.23 times the molar amount of titanium tetrabutylate (with respect to polyether) were reacted. A pale yellow reaction product with a Ti content of 3.85% (with respect to the total weight of catalyst) and a viscosity of 6100 mpa·s (25° C.) was obtained.

Example 4

Using the same method as described in Example 1, polyether PET3 and 0.25 times the molar amount of titanium tetrabutylate (with respect to polyether) were reacted. A pale yellow reaction product with a Ti content of 3.78% (with respect to the total weight of catalyst) and a viscosity of 30200 mpa·s (25° C.) was obtained.

Example 5

Using the same method as described in Example 1, poly(ethylene adipate) with an average molecular weight of 440 g/mol and 0.25 times the molar amount of titanium tetrabutylate (with respect to polyester) were reacted. A pale yellow reaction product with a Ti content of 2.66% (with respect to the total weight of catalyst) and a viscosity of 920 mPa·s (25° C.) was obtained.

Example 6

Using the same method as described in Example 1, polyether PET2 and 0.23 times the molar amount of zirconium tetrabutylate (with respect to polyether) were reacted. A pale yellow highly viscous reaction product with a Zr content of 7.09% (with respect to the total weight of catalyst) was obtained.

The Preparation of Polyesters Using Catalysts According to the Invention

Examples 7–15

The reaction products from Examples 1 to 6 were used to prepare polyesters. Titanium tetra-n-butylate or zirconium tetra-n-butylate (not according to the invention) were used as comparison catalysts (see comparison Examples 13 and 14). Comparison Example 15 describes the preparation of a polyester without adding a catalyst.

Diethylene glycol (3.986 kg; 37.6 mol) and trimethylolpropane (0.242 kg; 1.8 mol) as polyalcohol components and adipic acid (5.186 kg; 35.5 mol) as polycarboxylic acid component were initially introduced into a reactor and the reaction mixture was heated under nitrogen at 200° C. until water no longer distills over at atmospheric pressure. Then the metal catalyst according to the invention, from Examples 1 to 6, was added, wherein the particular amount was chosen in such a way that comparable metal concentrations are produced in the reaction product. As the reaction proceeds further, the pressure in the reactor was reduced stepwise to about 15 mbar, wherein additional water distills off. The polycondensation reaction was continued at about 200° C. until the acid value has dropped to a value of ≦1.0 mg KOH/g. The duration of the vacuum phase was characteristic of the catalyst used and was defined as the reaction time.

TABLE 2

Examples 7–12 according to the invention; comparison examples 13–15.

| Examples | Catalyst | Amount of catalyst [g] | Reaction time [hrs] | Acid value [mg KOH/g] |
|---|---|---|---|---|
| 7 | Example 1 | 1.07 | 8 | 1.0 |
| 8 | Example 2 | 0.81 | 9 | 0.5 |
| 9 | Example 3 | 1.47 | 8 | 0.8 |
| 10 | Example 4 | 2.00 | 8 | 0.8 |
| 11 | Example 5 | 2.47 | 9 | 0.5 |
| 12 | Example 6 | 6.98 | 15 | 0.9 |
| 13 | Ti(OBu)$_4$ | 0.40 | 8 | 0.6 |
| 14 | Zr(OBu)$_4$ | 1.92 | 15 | 0.9 |
| 15 | none | 0.00 | >25 | 1.2 |

Table 2 shows that titanium catalysts according to the invention (see Examples 7–11), when compared with tita-nium tetrabutylate (see Example 13), have about the same activity. Comparable reactor occupation times for the vacuum phase were also found for Example 6 according to the invention when compared with zirconium tetrabutylate (see Example 14). As would be expected, long reaction times and unfavorable conversions have to be accepted when no catalyst is used (Example 15).

Optical Properties of the Prepared Polyesters:

Examples 16–21

The catalysts from Examples 1–4 and 6 above were used in the manner as described above to prepare polyesters and the optical quality of the resultant polyester products was tested. Titanium tetra-n-butylate (see comparison Example 21), as a commonly used esterification and transesterification catalyst, was used for comparison.

TABLE 3

Examples 16–20 according to the invention; comparison example 21.

| Examples | Catalyst | Metal concentration [ppm] | Product color [Hazen] |
|---|---|---|---|
| 16 | Example 1 | 7 | 18 |
| 17 | Example 2 | 7 | 24 |
| 18 | Example 3 | 7 | 25 |
| 19 | Example 4 | 9 | 24 |
| 20 | Example 6 | 61 | 29 |
| 21 | Ti(OBu)$_4$ | 7 | 47 |

Table 3 shows that polyesters with improved optical properties, i.e. those exhibiting half the color index (about 18–25 Hazen), were obtained when using titanium catalysts according to the present invention (see Examples 16–19) rather than titanium tetrabutylate (see Example 21). A reduction in the yellow coloration of the polyester was also found when using a zirconium catalyst according to the invention (Example 6).

Resistance to Hydrolysis of Catalysts According to the Invention:

Examples 22–24

To check for susceptibility to hydrolysis, the catalysts in Examples 3 and 4 were dissolved in butanediol (40 wt. %) and subjected to atmospheric moisture/oxygen in an open vessel. A solution of titanium tetrabutylate was used for comparison purposes (Example 24, not according to the invention). The degree of hydrolysis of the catalyst was determined after defined time intervals. The occurrence of a cloudy or viscous solution may be interpreted as partial hydrolysis taking place; the occurrence of a white solid material may be interpreted as (almost) complete hydrolysis.

TABLE 4

Examples 22–24.

| Examples | Catalyst | 1 day | 3 days | 14 days |
|---|---|---|---|---|
| 22 | Example 3 | clear solution | clear solution | cloudy solution |
| 23 | Example 4 | clear solution | clear solution | clear solution |
| 24 | Ti(OBu)$_4$ | clear solution | viscous solution | white solid |

Table 4 shows that catalysts according to the invention (Examples 22 and 23), when compared with titanium tetrabutylate (comparison Example 24) have a much improved stability towards atmospheric moisture/oxygen.

When the experiments relating to resistance to hydrolysis were repeated with the pure substances, i.e. without solvent, then complete hydrolysis of titanium tetrabutylate was observed after only 5 hours. Example 3 according to the invention forms a gel-like skin at the surface, which indicates partial hydrolysis. Example 4 according to the invention, on the other hand, remains unaltered and stable even after 5 days and can be used as a catalyst with unchanged activity (acid value: 0.8 mg KOH/g after 8 hours in the vacuum phase) for the polycondensation reaction described above.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Titanium/zirconium catalysts comprising the reaction product of:
   a) one or more orthoesters or one or more condensed orthoesters of titanium and/or zirconium; with
   b) one or more polyalcohols which contain at least two hydroxyl groups and have a number average molecular weight of at least 180 g/mol;
wherein the molar ratio of polyalcohol b) to orthoester or condensed orthoester of titanium and/or zirconium a) is at least 2:1.

2. The catalysts of claim 1, wherein the molar ratio of polyalcohol b) to orthoester or condensed orthoester of titanium and/or zirconium a) is from 3:1 to 5:1.

3. The catalysts of claim 1, wherein said orthoesters of titanium and/or zirconium correspond to the general formula:

$$M(OR)_4$$

wherein:
   M: represents titanium and/or zirconium; and
   each R: may be the same or different, and represents a linear alkyl group, a branched alkyl group, or a cyclic alkyl group.

4. The catalysts of claim 1, wherein said orthoesters are selected from the group consisting of titanium tetraisopropoxylate, titanium tetra-n-butoxylate and mixtures thereof.

5. The catalysts of claim 1, wherein said condensed orthoesters of titanium/zirconium correspond to the general formula:

$$R^1O[M(OR^1)_2O]_nR^1$$

wherein:
   M: represents titanium and/or zirconium;
   each $R^1$: may be the same or different, and represents a linear alkyl group, a branched alkyl group or a cyclic alkyl group; and
   n: a number less than 20.

6. The catalysts of claim 1, wherein said condensed orthoesters are selected from the group consisting of poly(titanium isopropoxylate), poly(titanium butoxylate) and mixtures thereof.

7. The catalysts of claim 1, wherein said polyalcohols comprise polyetherpolyols which are prepared by polyaddition of one or more alkylene oxides to one or more polyfunctional starter compounds in the presence of one or more basic catalysts.

8. The catalysts of claim 1, wherein said polyalcohols comprise polyesterpolyols which are prepared by reacting aromatic and/or aliphatic polycarboxylic acids, and polyols which contain at least two hydroxyl groups.

9. A process for the preparation of titanium/zirconium catalysts, comprising reacting:
   a) one or more orthoesters or one or more condensed orthoesters of titanium and/or zirconium; with
   b) one or more polyalcohols which contain at least two hydroxyl groups and have a number average molecular weight of at least 180 g/mol;
wherein the molar ratio of polyalcohol b) to orthoester or condensed orthoester of titanium and/or zirconium a) is at least 2:1.

10. A process for the preparation of (poly)esters by esterification of one or more low molecular weight polycarboxylic acids with one or more low molecular weight polyalcohols in the presence of one or more titanium/zirconium catalysts of claim 1.

11. A process for the preparation of (poly)esters by transesterification of one or more alkyl esters of polycarboxylic acids and one or more polyalcohols in the presence of one or more titanium/zirconium catalysts of claim 1.

12. In a process for the preparation of a polyurethane foam comprising reacting at least one polyisocyanate component with at least one (poly)ester component, the improvement wherein said (poly)ester component was prepared in the presence of one or more titanium/zirconium catalysts of claim 1.

* * * * *